US008483698B2

(12) United States Patent
Papasakellariou et al.

(10) Patent No.: US 8,483,698 B2
(45) Date of Patent: Jul. 9, 2013

(54) SELECTIVE APPLICATION OF FREQUENCY HOPPING FOR TRANSMISSION OF CONTROL SIGNALS

(75) Inventors: Aris Papasakellariou, Houston, TX (US); Joon-Young Cho, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 436 days.

(21) Appl. No.: 12/793,278

(22) Filed: Jun. 3, 2010

(65) Prior Publication Data
US 2010/0311431 A1 Dec. 9, 2010

Related U.S. Application Data

(60) Provisional application No. 61/183,909, filed on Jun. 3, 2009.

(51) Int. Cl.
*H04W 72/00* (2009.01)

(52) U.S. Cl.
USPC .......................................... 455/450

(58) Field of Classification Search
USPC .......................................... 455/450
See application file for complete search history.

(56) References Cited

U.S. PATENT DOCUMENTS

| 2005/0020271 A1* | 1/2005 | Fukuda et al. ................ 455/447 |
| 2006/0078039 A1 | 4/2006 | Dhar et al. |
| 2006/0092873 A1* | 5/2006 | Khayrallah .................. 370/329 |
| 2007/0211656 A1* | 9/2007 | Kwak et al. .................. 370/319 |
| 2008/0090528 A1* | 4/2008 | Malladi ........................ 455/70 |
| 2008/0188229 A1* | 8/2008 | Melis et al. .................. 455/450 |
| 2008/0279170 A1 | 11/2008 | Malladi et al. |
| 2010/0008294 A1* | 1/2010 | Palanki et al. ............... 370/328 |
| 2010/0074209 A1* | 3/2010 | Montojo et al. ............. 370/329 |
| 2010/0173641 A1* | 7/2010 | Kim et al. .................... 455/450 |
| 2012/0039291 A1* | 2/2012 | Kwon et al. ................. 370/329 |
| 2012/0176989 A1* | 7/2012 | Papasakellariou et al. ... 370/329 |

FOREIGN PATENT DOCUMENTS
WO    WO 2008/153298 A1 * 12/2008

* cited by examiner

*Primary Examiner* — Nathan Mitchell
(74) *Attorney, Agent, or Firm* — The Farrell Law Firm, P.C.

(57) ABSTRACT

A Method and apparatus for selectively applying, by a User Equipment (UE), Frequency Hopping (FH) for a transmission of Uplink Control Information (UCI) signals in a Physical Uplink Control CHannel (PUCCH). The UE applies FH when the UCI is of a first type and does not apply FH when the UCI is of a second type. The UE applies FH when transmission diversity is not applied to the UCI transmission and does not apply FH when transmission diversity is applied to the UCI transmission. UEs operating in a legacy mode do not apply FH to the UCI transmission while UEs operating with additional functionalities may apply FH to the UCI transmission according to the UCI type and the use of transmission diversity.

17 Claims, 17 Drawing Sheets

SELECTIVE APPLICATION OF FREQUENCY HOPPING FOR TRANSMISSION OF CONTROL SIGNALS

PRIORITY

The present application claims priority under 35 U.S.C. §119(e) to U.S. Provisional Application No. 61/183,909, entitled "Selective Application of Frequency Hopping for Transmission of Control Signals", which was filed on Jun. 3, 2009, the contents of which are incorporated herein by reference.

BACKGROUND OF THE INVENTION

1. Field of the Invention

The present invention is directed generally to wireless communication systems and, more specifically, to the transmission of control information in the uplink of a communication system.

2. Description of the Art

A conventional communication system includes a DownLink (DL), for supporting transmissions of signals from a base station (Node B) to User Equipments (UEs), and an UpLink (UL), for supporting transmissions of signals from UEs to the Node B. UEs, also commonly referred to as terminals or mobile stations, may be fixed or mobile and include devices such as wireless devices, cellular phones, personal computer devices, etc. A Node B is generally a fixed station and may also be referred to as a Base Transceiver System (BTS), an access point, or other similar terminology.

A UE typically transmits Uplink Control Information (UCI) to provide, to the Node B, information facilitating the communication process. The UCI may include ACKnowledgement (ACK) information associated with a Hybrid Automatic Repeat reQuest (HARQ), HARQ-ACK, Channel State Information (CSI), etc. A HARQ-ACK informs the Node B whether information was correctly or incorrectly received by a UE through a Transport Block (TB). A CSI informs the Node B of any of a Channel Quality Indicator (CQI), a Precoding Matrix Indicator (PMI), a Rank Indicator (RI), etc. A UE can transmit UCI separately from data information through a Physical Uplink Control CHannel (PUCCH) or, together with data information, in a Physical Uplink Shared CHannel (PUSCH) over a Transmission Time Interval (TTI).

The CSI includes the CQI, PMI, and RI and provides to the Node B information about channel conditions the UE experiences in the DL so that the Node B can select appropriate parameters, such as the Modulation and Coding Scheme (MCS), for a signal transmission to the UE and ensure a desired BLock Error Rate (BLER) for the respective information packet. The CQI provides, to the Node B, a measurement of the Signal to Interference and Noise Ratio (SINR) over sub-bands or over a whole operating BandWidth (BW), typically in the form of a highest MCS, for which a predetermined BLER for a signal transmission in the respective BW can be achieved. The PMI/RI includes information indicating, to the Node B, how to combine the signal transmission to the UE from multiple Node B antennas in accordance with the Multiple-Input Multiple-Output (MIMO) principle.

An example of a conventional PUCCH structure for the CSI transmission during an UL TTI, which for simplicity is assumed to consist of one sub-frame, is illustrated in FIG. 1. The sub-frame 110 includes two slots. Each of slots 120 and 125 includes $N^{UL}_{symb}$ symbols for the transmission of CSI signals 130 or Reference Signals (RS) 140. Each symbol further includes a Cyclic Prefix (CP) to mitigate interference due to channel propagation effects. The location of the CSI transmission in the first slot 120 is at a different part of the operating BW than the CSI transmission in the second slot 125 in order to obtain frequency diversity.

Some symbols in each slot can be used for RS transmission to provide channel estimates and enable coherent demodulation of the received CSI signal. In the present example according to FIG. 1, the operating BW consists of frequency resource units referred to as Resource Blocks (RBs). Each RB consists of $N_{sc}^{RB}$ sub-carriers, or Resource Elements (REs), and a UE transmits CSI signals and RS over one RB 150 per sub-frame symbol.

An example of a conventional PUCCH structure for the HARQ-ACK transmission over a single sub-frame is illustrated in FIG. 2. Regarding the CSI PUCCH structure, the sub-frame 210 includes two slots and each of slots 220 and 225 includes $N^{UL}_{symb}$ symbols for the transmission of HARQ-ACK signals 230 or RS 240. A UE transmits a HARQ-ACK signal and RS over one RB 250 and the transmission in the first slot 220 is at a different RB than the transmission in the second slot 225, in order to obtain frequency diversity. The HARQ-ACK PUCCH structure may have a different number of symbols in each slot for RS transmission and for HARQ-ACK signal transmission than the CSI PUCCH structure.

An example of a conventional structure for the CSI transmission in the PUCCH slot 120 of FIG. 1 is illustrated in FIG. 3. The transmission in the second slot 125 is at a different RB and has effectively the same structure. The CSI symbols $d_0, d_1, d_2, d_3, d_4$ 310 modulate 320 a "Constant Amplitude Zero Auto-Correlation (CAZAC)" sequence 330, for example, using Quaternary Phase Shift Keying (QPSK), which is then transmitted after performing an Inverse Fast Frequency Transform (IFFT), which is further described hereinbelow. Each RS 340 is transmitted through the unmodulated CAZAC sequence.

An example of a conventional structure for the HARQ-ACK transmission in PUCCH slot 220 of FIG. 2 is illustrated in FIG. 4. The transmission in the other slot 225 is at a different RB and has effectively the same structure. The HARQ-ACK bits b 410 modulate 420 a CAZAC sequence 430, for example with Binary Phase Shift Keying (BPSK) or QPSK, which is then transmitted after performing the IFFT. Each RS 440 is transmitted through the unmodulated CAZAC sequence.

An example of CAZAC sequences is given by Equation 1:

$$c_k(n) = \exp\left[\frac{j2\pi k}{L}\left(n + n\frac{n+1}{2}\right)\right] \quad (1)$$

where L is the length of the CAZAC sequence, n is the index of an element of the sequence n={0,1, ..., L−1}, and k is the index of the sequence. If L is a prime integer, then L−1 distinct sequences are defined as k ranges in {0,1, ..., L−1}. If an RB includes an even number of REs, such as for example $N_{sc}^{RB}=12$, CAZAC sequences with even length can be directly generated through a computer search for sequences satisfying the CAZAC properties.

FIG. 5 illustrates an example of a conventional transmitter structure for a CSI or a HARQ-ACK in a PUCCH. The example according to FIG. 5 refers to a frequency-domain version of a computer generated CAZAC sequence, at block 510. A first RB and a second RB are selected, at block 520, and sub-carrier mapping is performed, at block 530, for transmission of the CAZAC sequence in the first slot and in the second slot, respectively. An IFFT is performed, at block 540, and a Cyclic Shift (CS), as it is subsequently described, is applied to the output, at block 550. Finally, the CP insertion, at block 560, and filtering, at block 570, are applied to the signal, which is transmitted at 580. In the example according to FIG. 5, a UE applies zero padding in REs used for signal transmission by other UEs and in guard REs (not shown). Moreover, for clarity and conciseness, additional transmitter circuitry such as digital-to-analog converter, analog filters, amplifiers, and transmitter antennas as they are known in the art, are not shown.

Reverse (complementary) transmitter functions are performed for reception of CSI or HARQ-ACK in the PUCCH. The reverse functions are conceptually illustrated in FIG. 6, where the operations are the reverse of the operations illustrated in FIG. 5. An antenna 610 receives the RF analog signal and after further processing units (such as filters, amplifiers, frequency down-converters, and analog-to-digital converters) the digital received signal is filtered, at block 620, and the CP is removed at block 630. Subsequently, the CS is restored at block 640, and a Fast Fourier Transform (FFT) is applied at block 650. After sub-carrier de-mapping at block 660, the first RB and the second RB of the signal transmission in the first slot and in the second slot, respectively, are selected at block 665, and the signal is correlated at block 670 with a replica of the CAZAC sequence output from block 680. The output 690 can then be passed to a channel estimation unit, such as a time-frequency interpolator, in case of RS, or to a detection unit in case of CSI or HARQ-ACK.

Different CSs of the same CAZAC sequence provide orthogonal CAZAC sequences and can therefore be allocated to different UEs for PUCCH signal transmission in the same RB and achieve orthogonal UE multiplexing. This allocation principle is illustrated in FIG. 7. In order for the multiple CAZAC sequences 710, 730, 750, 770 generated correspondingly from the multiple CSs 720, 740, 760, 780 of the same root CAZAC sequence to be orthogonal, the CS value Δ 790 should exceed the channel propagation delay spread D (including a time uncertainty error and filter spillover effects). If $T_S$ is the symbol duration, the number of such CSs is equal to the mathematical floor of the ratio $T_S/D$.

In addition to orthogonal multiplexing of PUCCH transmissions in the same RB from different UEs, as in FIG. 3 for a CSI or as in FIG. 4 for a HARQ-ACK, using a different CS of a CAZAC sequence, orthogonal multiplexing can also be achieved in case of HARQ-ACK in the time domain through the use of orthogonal covering codes. For example, in FIG. 4, the transmission of the HARQ-ACK information symbols may be modulated by a length-4 Orthogonal Covering Code (OCC), such as a Walsh-Hadamard code, while the transmission of the RS may be modulated by a length-3 OCC, such as a Discrete Fourier Transform (DFT) code (not shown for clarity and conciseness). In this manner, the multiplexing capacity of PUCCH transmissions in one RB in case of HARQ-ACK is increased by a factor of 3 (the factor being determined by the smallest of the OCC lengths).

For a UE transmitter equipped with more than one antenna, Transmitter Diversity (TxD) can provide spatial diversity and enhance the reliability of the received signal. Two such TxD methods for PUCCH transmission are the Space Time Block Coding (STBC) method and the Orthogonal Resource Transmission (ORT) method.

With STBC, considering the CSI, if the first antenna transmits the coded CSI symbols $d_0,d_1,d_2,d_3,d_4$ in one slot, as shown in FIG. 3, the second antenna transmits the coded CSI symbols $d_1^*,-d_0^*,d_3^*,-d_2^*,d_4$ where d* is the complex conjugate of d. Since the number of coded CSI symbols per slot is odd and the transmission in the first slot is at a different RB than the transmission in the second slot, one coded CSI symbol in each slot cannot be paired for STBC. In the above example, that coded CSI symbol was assumed to be $d_4$ but any other symbol could have been selected. STBC maintains the use of only one CS for the CSI PUCCH transmission if the RS from the UE antennas in each slot are multiplexed using OCC where the OCC {1, −1} applies to the RS transmission from the second UE antenna. While FIG. 3 illustrates a CSI PUCCH transmission from the first UE antenna (in one slot), FIG. 8 is a direct equivalent for a CSI PUCCH transmission from the second antenna using STBC.

Denoted by $h_{i,j}$ the channel estimate for the signal received from the $i^{th}$ Node B antenna and transmitted by the $j^{th}$ UE antenna, where i=1,2 and j=1,2, and by $y_{i,k}$ the signal received by the $i^{th}$ Node B antenna in the $k^{th}$ symbol k=1,2, the decision for a pair of STBC symbols $[\hat{d}_k, \hat{d}_{k+1}]$ is performed according to $[\hat{d}_k, \hat{d}_{k+1}]^T = H^H [y_{1,k}, y_{2,k}, y_{1,k+1}^*, y_{2,k+1}^*]^T$ where $[\ ]_T$ denotes the transpose of a vector and $$H^H = \frac{\begin{bmatrix} h_{1,1}^* h_{2,1}^* - h_{1,2} - h_{2,2} \\ h_{1,2}^* h_{2,2}^* h_{1,1} h_{2,1} \end{bmatrix}}{(|h_{1,1}|^2 + |h_{2,1}|^2 + |h_{1,2}|^2 + |h_{22}|^2)}.$$

With ORT, the second UE transmitter antenna uses a second resource for the CSI transmission in the PUCCH. For example, for the CSI PUCCH transmission structure illustrated in FIG. 3, the first UE transmitter antenna uses a first CS and the second UE transmitter antenna uses a second CS. Therefore, the unpaired information symbol problem of STBC is avoided at the expense of doubling the number of required CSs, thereby doubling the respective PUCCH overhead. However, for HARQ-ACK signal transmission in the PUCCH, a UE may often have more than one orthogonal resource available (as determined by the pair of CS and OCC). For example, according to the $3^{rd}$ Generation Partnership Project (3GPP) Rel.8 Long Term Evolution (LTE), a UE may have more than one resource available for HARQ-ACK signal transmission in response to reception of a dynamically scheduled TB. Then, ORT can be applied according to the structure illustrated in FIG. 4 without requiring additional resources beyond the resources a UE has already assigned.

A problem with the application of STBC for a CSI transmission such as that illustrated in FIG. 3 is the existence of an unpaired information symbol in each PUCCH slot. This unpaired information signal necessitates a different treatment of such information symbols, thereby increasing the transmitter and receiver complexity and diminishing performance, as the unpaired symbol cannot benefit from spatial diversity. Otherwise, STBC achieves full diversity gain without reducing the data rate and allows for a simple linear receiver. On the other hand, ORT requires twice the overhead, and other TxD methods, such as Cyclic Delay Diversity (CDD) or Precoding Vector Switching (PVS) provide worse performance relative to STBC or ORT.

Therefore, there is a need to enable the application of STBC for PUCCH transmissions while avoiding the problem of an unpaired information symbol. There is also a need to enable multiplexing of PUCCH transmissions with STBC and without STBC. There is further another need to optimize PUCCH reception performance with STBC or ORT.

SUMMARY OF THE INVENTION

Accordingly, the present invention has been designed to solve at least the aforementioned limitations and problems in the prior art and the present invention provides methods and apparatus for a UE to transmit Uplink Control Information (UCI) in a Physical Uplink Control CHannel (PUCCH) where the application of Frequency Hopping for the UCI transmission depends on the UCI type and the use of transmission diversity.

According to an aspect of the present invention, a method in a communication system, wherein a User Equipment (UE) transmits, to a Node B, one of multiple types of Uplink Control Information (UCI) using a respective Physical Uplink Control CHannel (PUCCH) structure, a method, performed by the UE, for determining an application of Frequency Hopping (FH) for a UCI type transmission is provided. The method includes transmitting, when UCI is of a first type, the UCI using FH; and transmitting, when the UCI is of a second type, the UCI without using FH.

According to another aspect of the present invention, in a communication system, wherein a User Equipment (UE) transmits, to a Node B, an Uplink Control Information (UCI) in a Physical Uplink Control CHannel (PUCCH), a method, performed by the UE, for determining an application of Frequency Hopping (FH) for the UCI type transmission is provided. The method includes transmitting UCI of a first type using FH when transmission diversity is not applied; and transmitting UCI of a second type without using FH when transmission diversity is applied.

According to another aspect of the present invention, in a communication system, wherein User Equipments (UEs) from a first class of UEs and UEs from a second class of UEs transmit to, a Node B, Uplink Control Information (UCI) in a Physical Uplink Control CHannel (PUCCH), a method, performed by a UE, for applying Frequency Hopping (FH) for the UCI type transmission is provided. The method includes transmitting UCI of a type using FH if the UE belongs to the first class of UEs; and transmitting the UCI of a second type without using FH if the UE belongs to the second class of UEs.

According to another aspect of the present invention, a User Equipment (UE) apparatus for transmitting one of multiple types of Uplink Control Information (UCI) using a respective structure in a Physical Uplink Control CHannel (PUCCH) is provided. The apparatus includes a transmitter for, when UCI is of a first type, transmitting the UCI using frequency hopping; and a transmitter for, when the UCI is of a second type, transmitting the UCI without using frequency hopping.

According to another aspect of the present invention, a User Equipment (UE) apparatus for transmitting an Uplink Control Information (UCI) in a Physical Uplink Control CHannel (PUCCH) is provided. The apparatus includes a transmitter for transmitting UCI of a first type using frequency hopping when transmission diversity is not applied; and a transmitter for transmitting UCI of a second type without frequency hopping when transmission diversity is applied.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION OF EMBODIMENTS OF THE INVENTION

The present invention is described hereinafter with reference to the accompanying drawings. The present invention may, however, be embodied in many different forms and should not be construed as limited to the embodiments set forth herein.

Additionally, although the present invention is described in relation to a Single-Carrier Frequency Division Multiple Access (SC-FDMA) communication system, the present invention also applies to all Frequency Division Multiplexing (FDM) systems, in general, and to an Orthogonal Frequency Division Multiple Access (OFDMA), OFDM, FDMA, Discrete Fourier Transform (DFT)-spread OFDM, DFT-spread OFDMA, SC-OFDMA, and SC-OFDM in particular.

The present invention considers the selective use of slot-based Frequency Hopping (FH) for UCI signal transmissions in the PUCCH. Contrary to the prior art where slot-based FH is always applied in the PUCCH, regardless of the UCI type (such as CSI or HARQ-ACK), and the PUCCH signal transmission in the first slot is always at a different RB than the PUCCH signal transmission in the second slot, slot-based RB FH according to embodiments of the present invention may not always apply for the transmission of some UCI types, such as the CSI, in the PUCCH, and the same RB is then used for the PUCCH transmission in both sub-frame slots.

Figure 1:
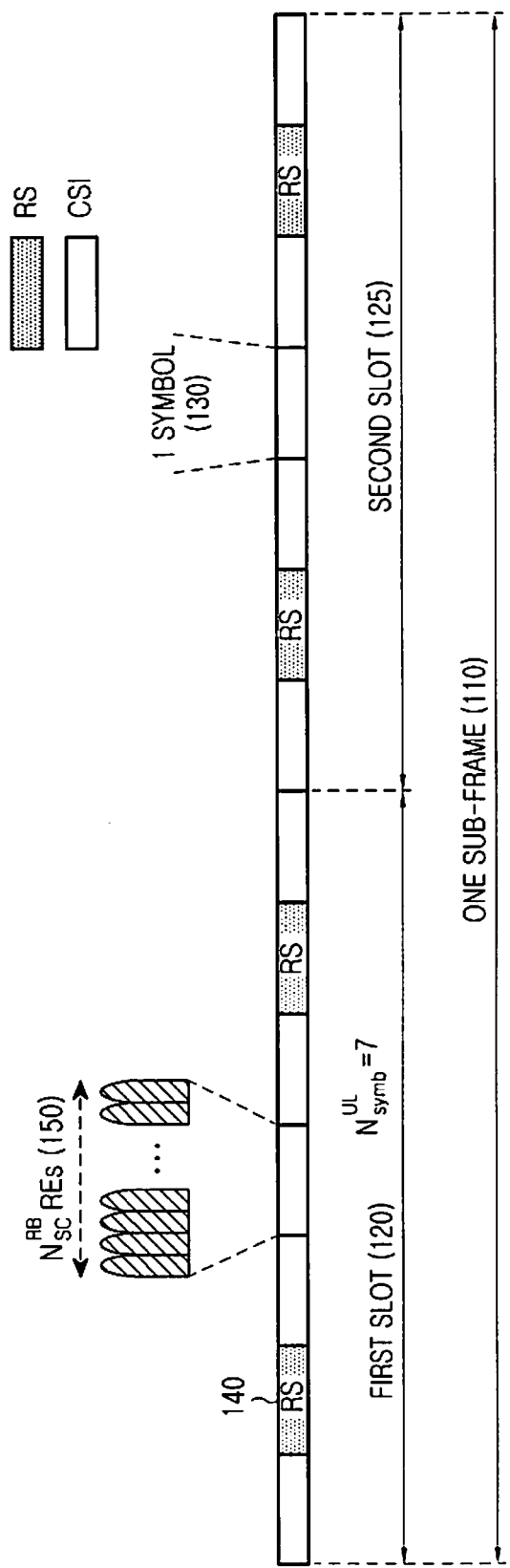
FIG. 1 is a diagram illustrating a conventional PUCCH structure for the CSI transmission.
Figure 2:
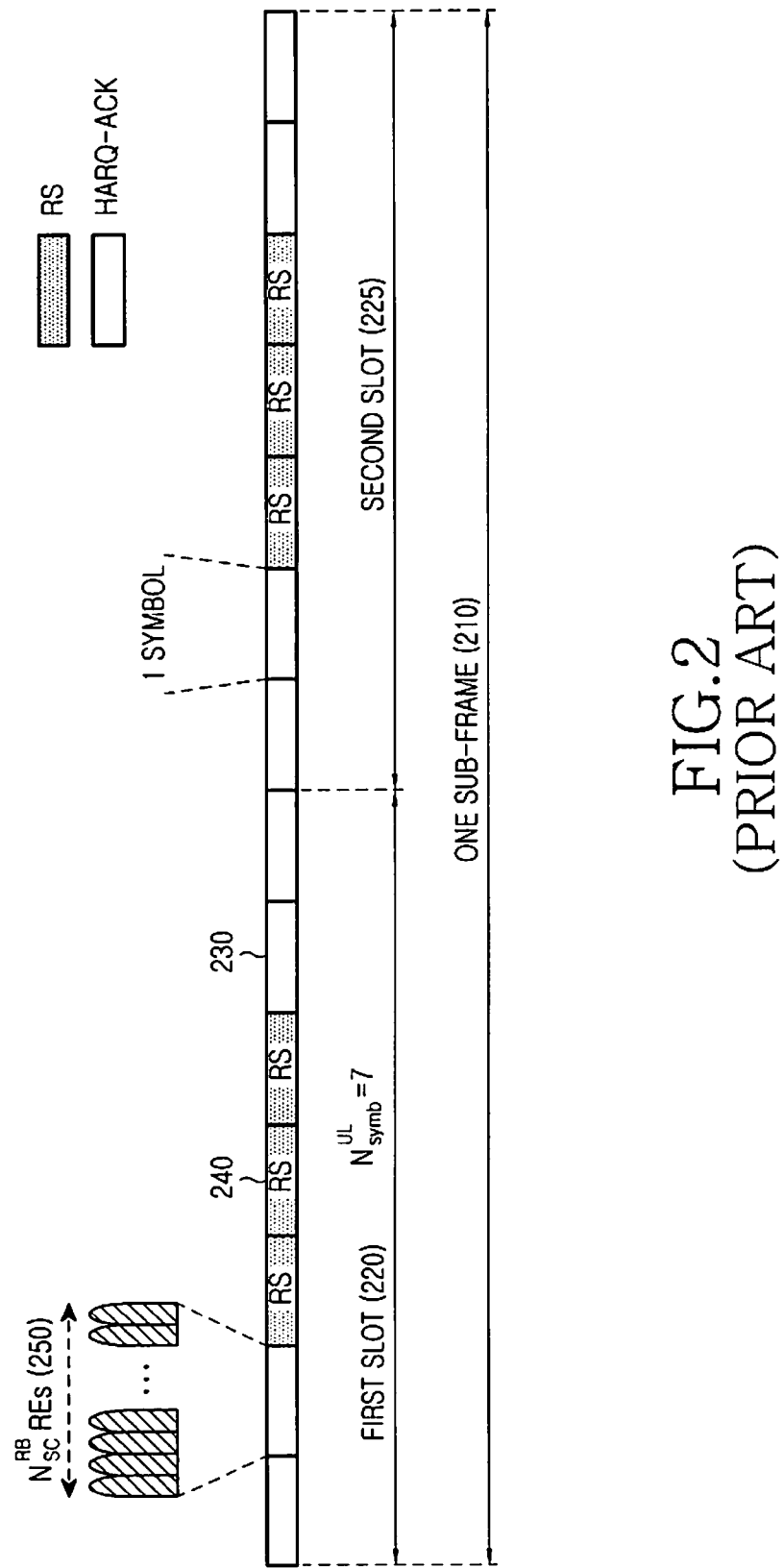
FIG. 2 is a diagram illustrating a conventional PUCCH structure for the HARQ-ACK transmission.
Figure 3:
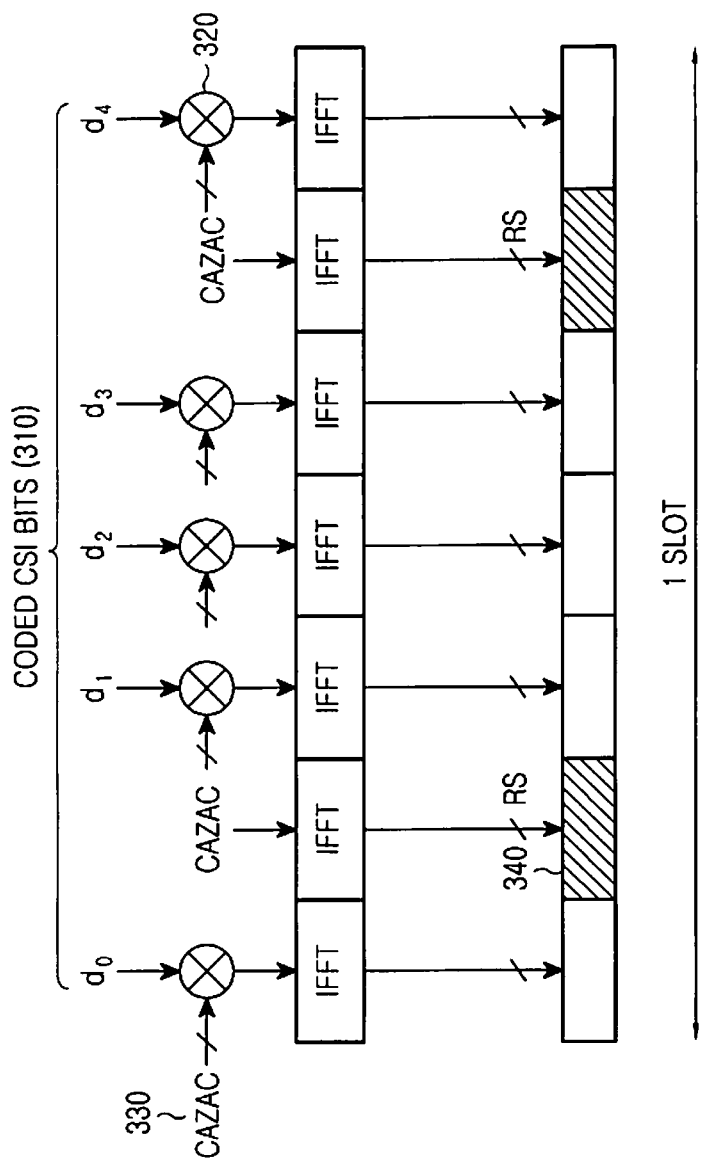
FIG. 3 is a diagram illustrating a conventional CSI transmission in a PUCCH slot.
Figure 4:
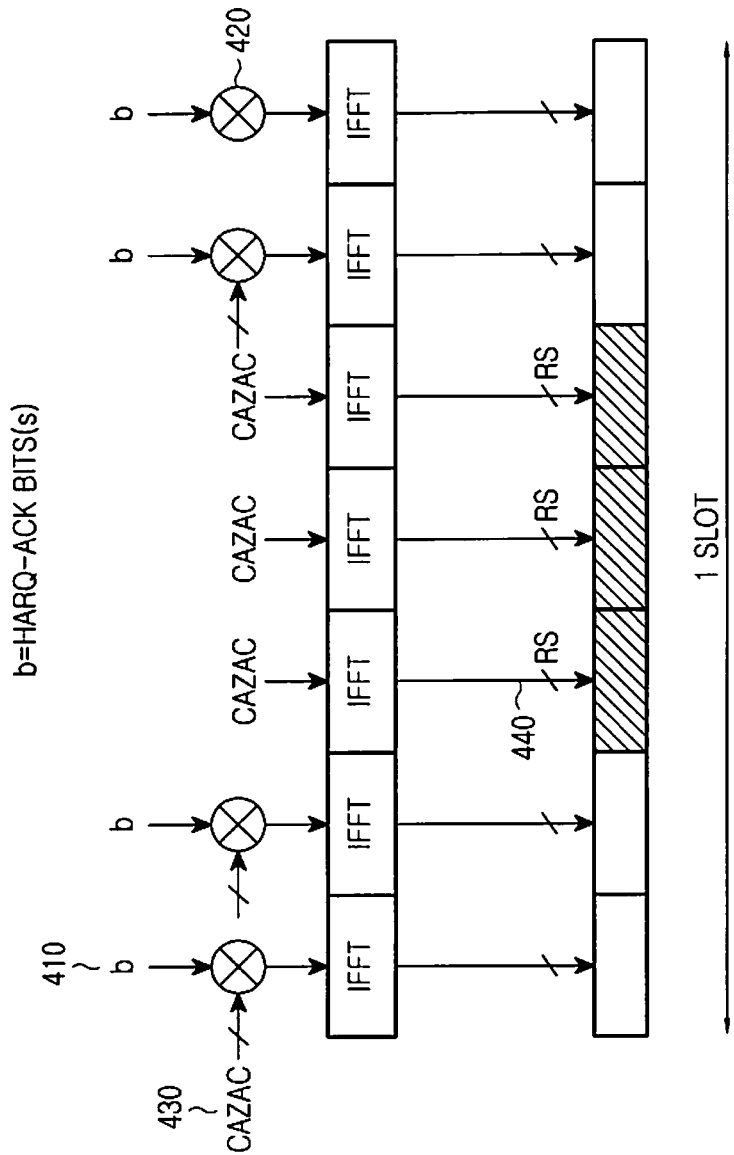
FIG. 4 is a diagram illustrating a conventional HARQ-ACK transmission in a PUCCH slot.
Figure 5:
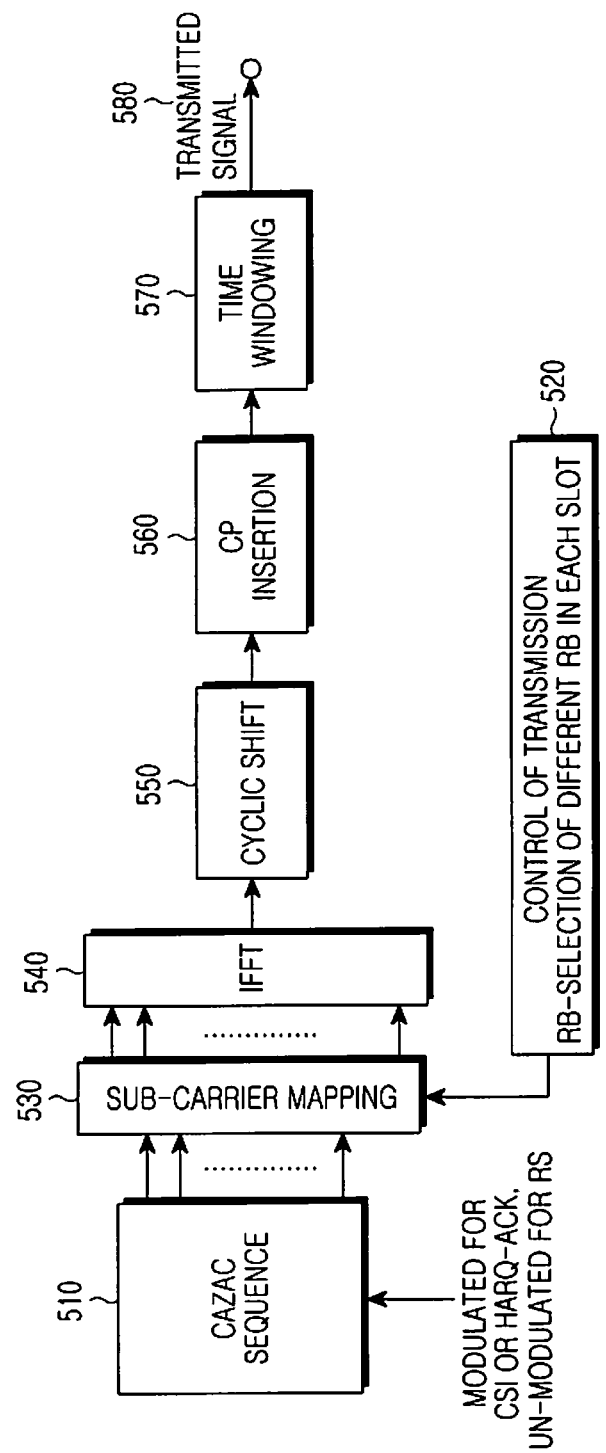
FIG. 5 is a block diagram illustrating a conventional transmitter structure for the CSI or the HARQ-ACK in the PUCCH.
Figure 6:
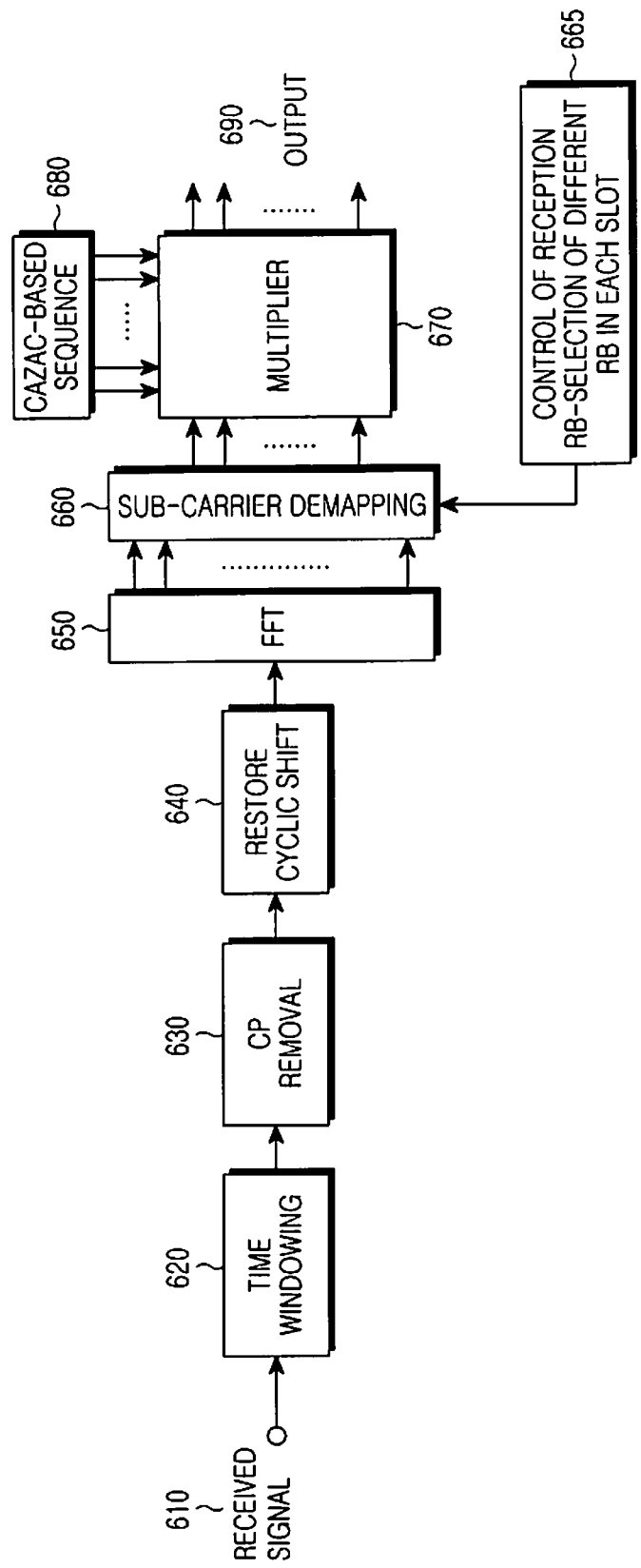
FIG. 6 is a block diagram illustrating a conventional receiver structure for the CSI or the HARQ-ACK in the PUCCH.
Figure 7:
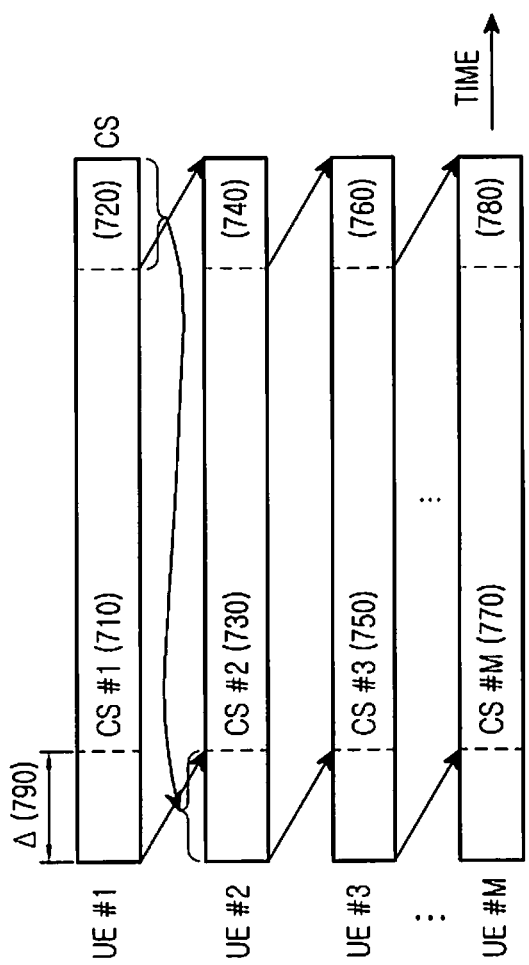
FIG. 7 is a block diagram illustrating a conventional orthogonal multiplexing of CAZAC sequences using different cyclic shifts of the same CAZAC sequence
Figure 8:
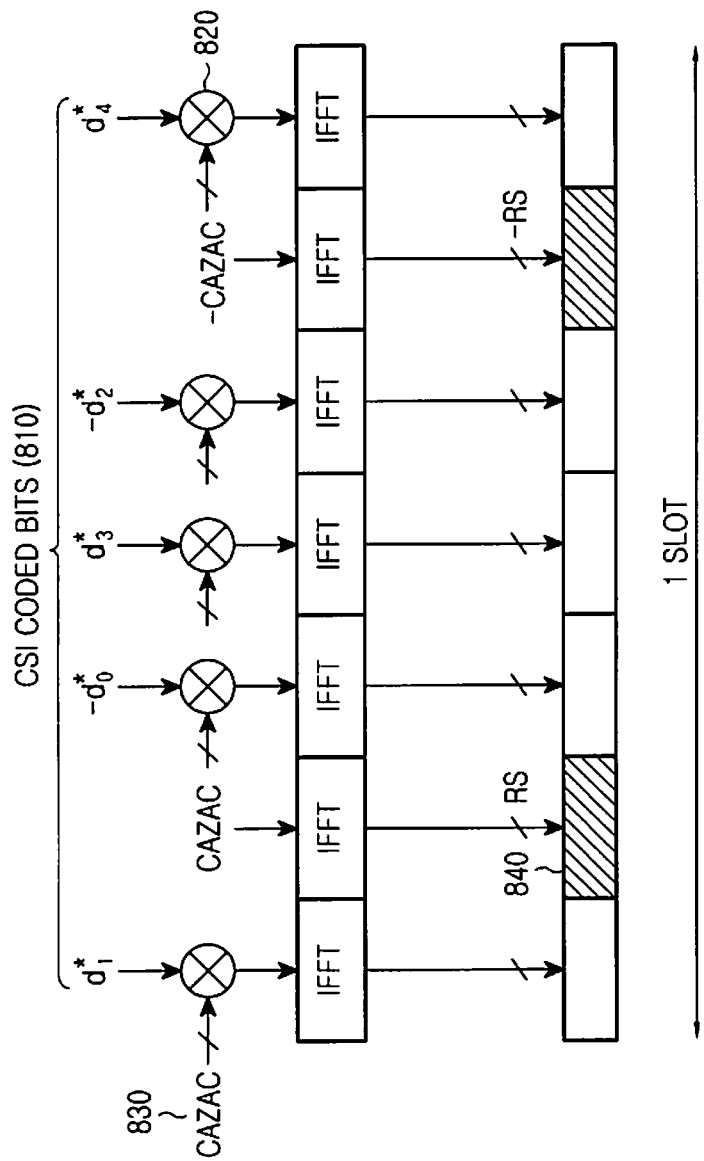
FIG. 8 is a diagram illustrating a conventional CSI transmission from a second UE transmitter antenna using STBC in a PUCCH slot.
Figure 9:
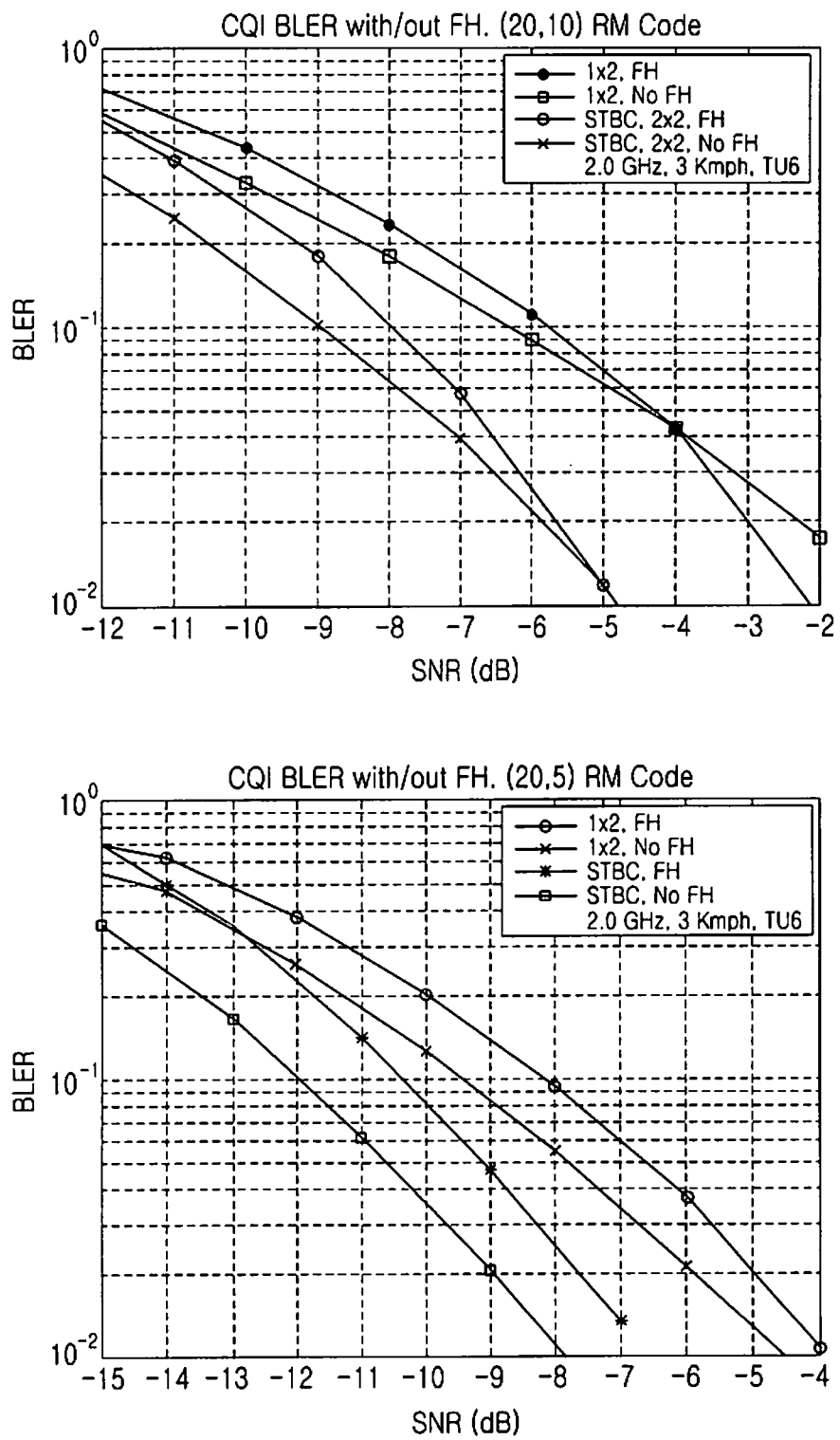
FIG. 9 is a diagram illustrating the BLER for the CSI transmission with and without slot-based FH and with and without STBC for operation in a first environment according to an embodiment of the present invention.
Figure 10:
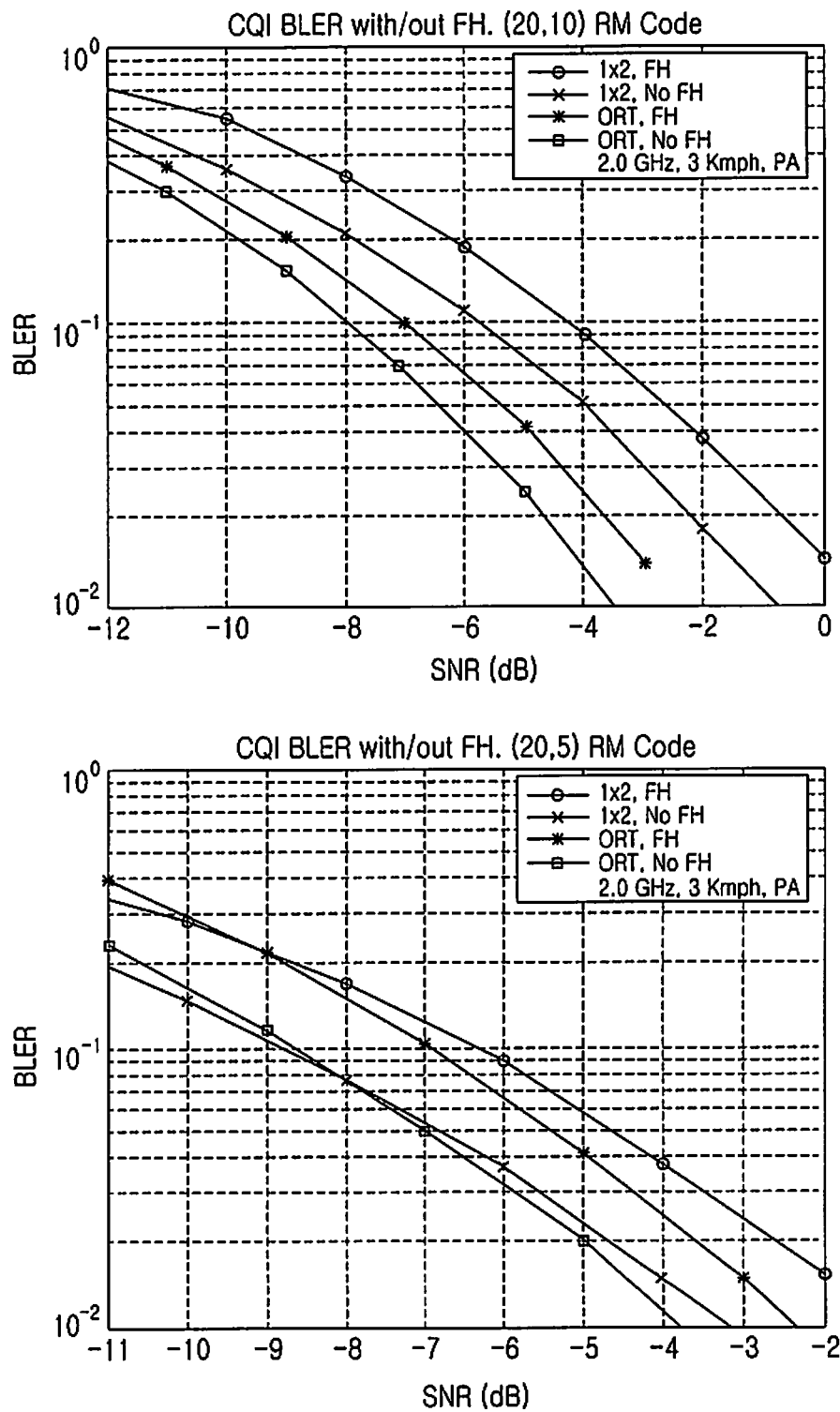
FIG. 10 is a diagram illustrating the BLER for the CSI transmission with and without slot-based FH and with and without STBC for operation in a second environment according to an embodiment of the present invention.

For the CSI PUCCH structure, an evaluation of BLER with and without slot-based FH and with and without STBC is illustrated in FIG. 9 for a frequency selective channel and in FIG. 10 for a frequency non-selective channel. For the CSI PUCCH structure of FIG. 3, the CSI is coded using a (20, A) punctured Reed-Muller (RM) code as in the 3GPP LTE where "A" denotes the number of CSI bits prior to encoding. The 20 coded CSI bits can then be transmitted in the 10 CSI symbols of the PUCCH sub-frame using QPSK modulation (each QPSK symbol carries 2 coded CSI bits).

In FIG. 9, the CSI BLER is presented for the frequency selective Terrestrial Urban (TU) channel with 6 paths (TU6), carrier frequency of 2 GHz, and UE velocity of 3 Kilometers per hour (3 Kmph). The following can be observed:

a) Even without STBC, in the case of 1 UE transmitter antenna and 2 Node B receiver antennas (1×2 configuration), slot-based FH may not be beneficial, as the gain from frequency diversity may be completely offset by the loss in channel estimation accuracy (as RS interpolation between the two slots is not useful).
   a. For high RM code rates, such as for (20, 10), slot-based FH may still be beneficial for the lower BLER values (around 1%). The BLER difference with slot-based FH and without slot-based FH is limited to less than 1 deciBel (dB) with the cross-over BLER point in favor of slot-based RB FH being around 4%.
   b. For low RM code rates, such as for (20, 5), slot-based FH is not beneficial for BLER values above 1%, and avoiding slot-based FH results in BLER gains of about 1 dB.

b) With STBC TxD, the additional diversity causes slot-based FH to be detrimental for target BLERs above 1%, even in highly frequency selective channels, even for the higher RM code rates. For the lower RM code rates, the loss is in the order of 1.5 dB.

The setup in FIG. 9 represents a best-case scenario for the CSI transmission with slot-based FH in the PUCCH as the channel in the second slot is fully uncorrelated from the channel in the first slot. In frequency non-selective channels, slot-based FH for the CSI transmission in the PUCCH becomes even more detrimental, as the performance loss from the degradation in channel estimation is not offset by a frequency diversity gain.

FIG. 10 presents the CSI BLER with and without slot-based FH, 1×2 and STBC TxD, and (20, 10) and (20, 5) RM codes. The example according to FIG. 10 is for a Pedestrian A (PA) channel that is relatively frequency non-selective. As shown in FIG. 10, slot-based FH degrades the BLER by at least 0.5 dB (high code rate and STBC) and as much as 2 dB (low code rate, no TxD). In the example according to FIG. 10, for the HARQ-ACK transmission in the PUCCH, slot-based FH is always enabled, as there is no diversity due to coding (repetition coding is used) and the target Bit Error Rate (BER) for the HARQ-ACK reception is typically much lower than the target BLER for the CSI reception. For these reasons, the diversity provided by slot-based FH of the HARQ-ACK transmission in the PUCCH is nearly always beneficial.

Based on the results illustrated FIG. 9 and FIG. 10, it becomes evident that slot-based FH for the CSI transmission in the PUCCH is mostly detrimental and will become even more so if other additional forms of diversity exist, such as for example more than two Node B receiver antennas (additional spatial diversity) or medium/high UE velocities (time diversity). However, for the HARQ-ACK, the target BER values are much smaller than the corresponding BER values for the CSI and the additional frequency diversity provided by slot-based FH is beneficial in achieving those target BER values. Typically, the target BER values for HARQ-ACK are in the order of 0.001 and below while the target BLER values for the CSI are in the order of 0.1-0.01 and can be achieved with BER values in the order of 0.1 (depending on the RM code rate).

A first aspect of the present invention considers selective use of slot-based FH for CSI transmission, while, for HARQ-ACK transmission slot-based, FH always applies. This can be realized through either of the following embodiments regarding use of slot-based FH for the CSI transmission and for HARQ-ACK transmission in a PUCCH:

a) Slot-based FH for the CSI transmission is always disabled while slot-based FH for the HARQ-ACK transmission is always enabled.

b) Slot-based FH for the CSI transmission is cell-specific, and its application is informed to the UEs by their serving Node B through a broadcast channel, while slot-based FH for the HARQ-ACK transmission is always enabled.

c) Slot-based FH for the CSI transmission is configured for each UE through UE-specific higher layer signaling from the Node B, together with the other parameters for the CSI transmission (such as the RB, the CS, the starting sub-frame, the transmission periodicity, and so on), while slot-based FH for the HARQ-ACK transmission is always enabled.

d) Slot-based FH for the CSI transmission is enabled for UEs with one transmitter antenna and disabled for UEs with more than one transmitter antenna (using transmission diversity) while slot-based FH for the HARQ-ACK transmission is always enabled regardless of the number of UE transmitter antennas.

A communication system may need to support CSI transmissions in the PUCCH from existing, Legacy-UEs (L-UEs), which always use slot-based FH and cannot be configured otherwise, and may also need support from Advanced-UEs (A-UEs) for which slot-based FH may be disabled. A second aspect of the present invention considers multiplexing of CSI transmissions in the PUCCH from such L-UEs and A-UEs.

Figure 11:
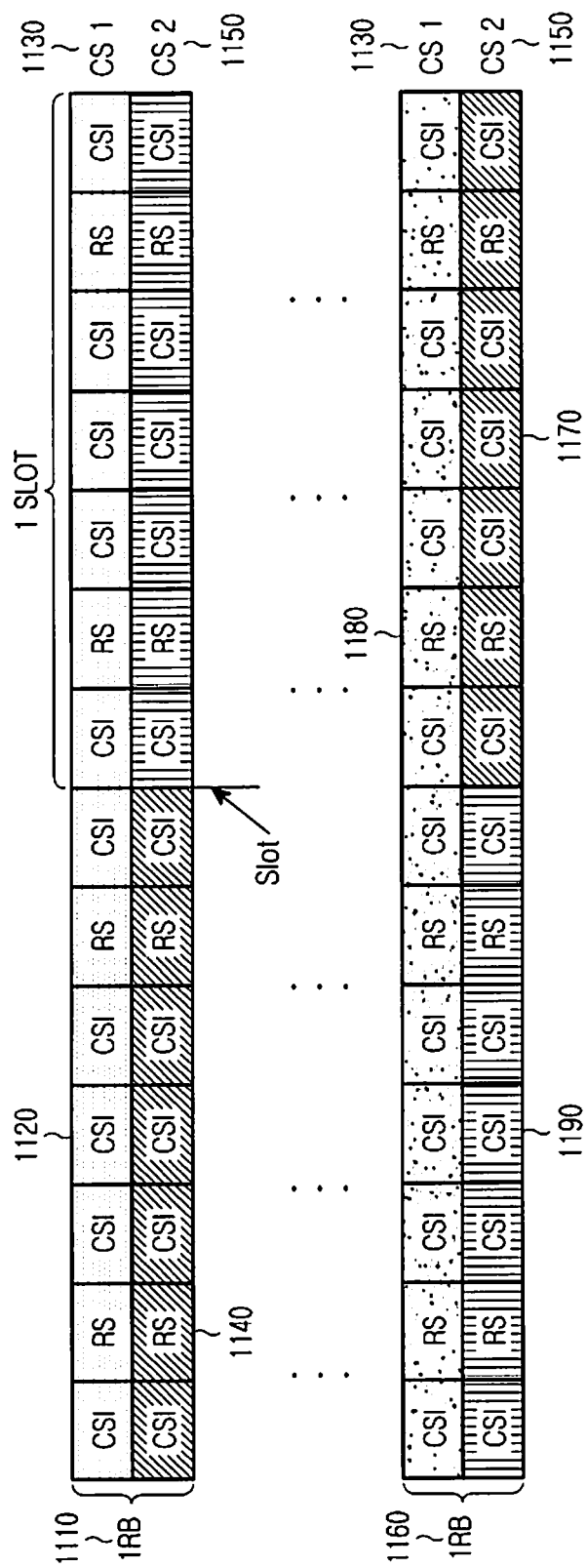
FIG. 11 is a diagram illustrating CSI multiplexing from advanced-UEs and legacy-UEs in the same resource block according to an embodiment of the present invention.

Simultaneous CSI transmissions in the PUCCH from A-UEs and L-UEs can be supported by respectively using different RBs. Nevertheless, use of the same RB is also possible by assigning different CS to A-U Es and to L-UEs. FIG. 11 illustrates CSI multiplexing from A-UEs and L-UEs in the same RB. In a first RB 1110, a first A-UE 1120 is allocated CS1 1130 for CSI transmission without slot-based FH. In the same first RB 1110, a first L-UE is allocated CS2 1150 for CSI transmission, which is in the first RB 1110 in the first slot 1140 and in a second RB 1160 in the second slot 1170. An identical operation starting from the second RB 1160 applies for a second A-UE 1180 (assigned CS1 in the second RB) and a second L-UE 1190 (assigned CS2 in the second RB). CS hopping may apply among consecutive sub-frame symbols or between sub-frame slots. Nevertheless, the same CS-based multiplexing in one RB applies for A-UEs and L-UEs when both use the same CS hopping pattern.

A third aspect of the present invention considers an application of STBC while avoiding the above-described problem of an unpaired symbol per slot. This aspect of the present invention overcomes this problem by maintaining a CSI transmission in the PUCCH in the same RB throughout the sub-frame (slot-based FH is disabled).

Figure 12:
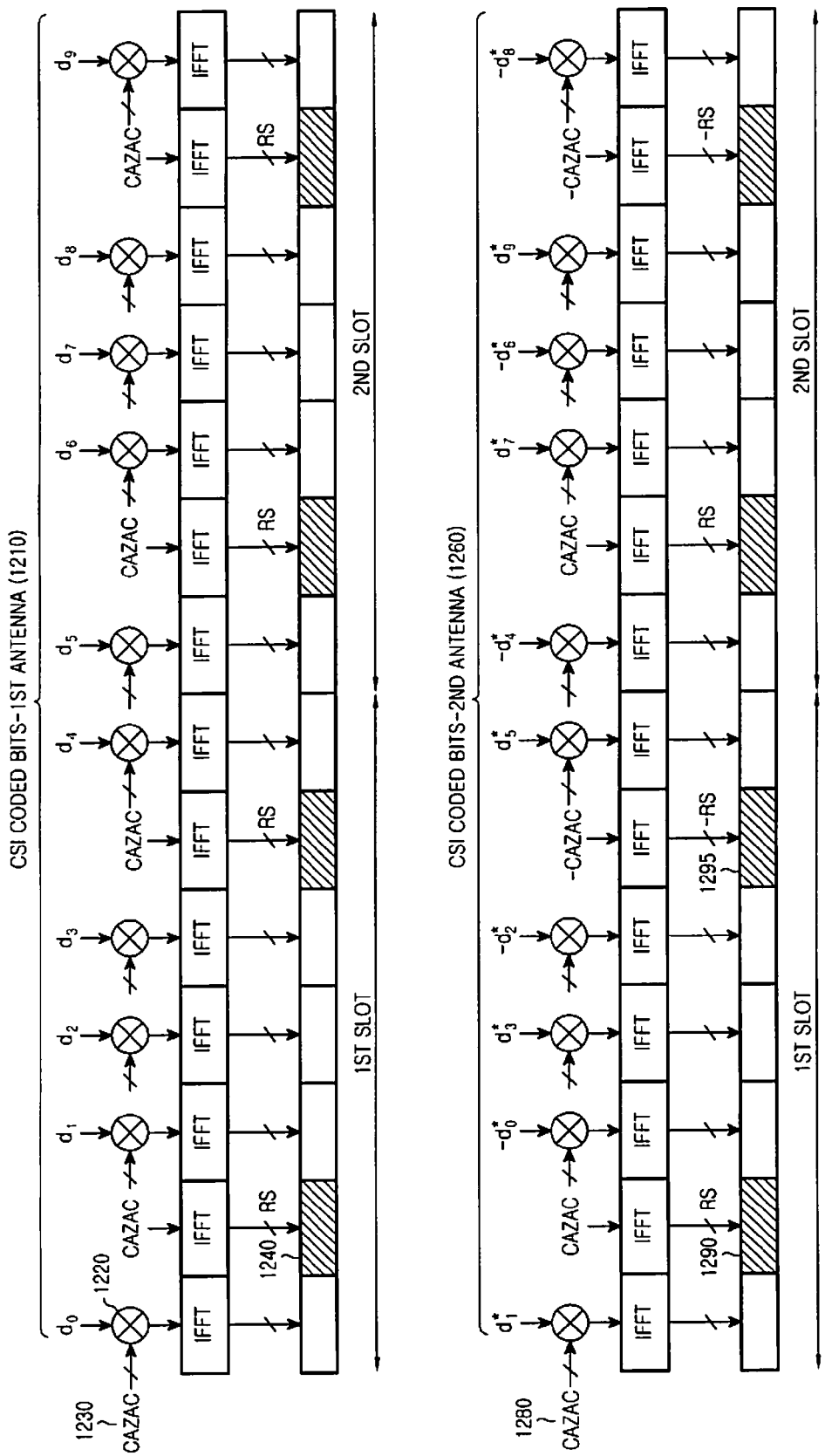
FIG. 12 is a diagram illustrating an exemplary application of STBC for the CSI transmission over a PUCCH sub-frame according to an embodiment of the present invention.

FIG. 12 illustrates an embodiment of the present invention for applying STBC for a CSI transmission over a PUCCH sub-frame. The first antenna transmits 10 CSI coded symbols 1210, $d_0,d_1,d_2,d_3,d_4,d_5,d_6,d_7,d_8,d_9$ using QPSK modulation. Each CSI coded symbol (including 2 CSI coded bits for a total of 20 coded CSI bits) modulates, at 1220, a CAZAC sequence 1230. The transmission of an unmodulated CAZAC sequence at some sub-frame symbols can serve as an RS 1240. To realize STBC, the second antenna transmits the 10 CSI coded symbols 1260, $d_1^*,-d_0^*,d_3^*,-d_2^*,d_5^*,-d_4^*,d_7^*,-d_6^*,d_9^*,-d_8^*$, using QPSK modulation. As for the first antenna, each CSI coded symbol modulates, at 1270, a CAZAC sequence 1280 and the transmission of an unmodulated CAZAC sequence at the same sub-frame symbols as for the first antenna can serve as an RS. However, every second RS 1295 is a negative of a corresponding first RS 1290. Consequently, by averaging two consecutive sub-frame symbols with RS transmission, a channel estimate for each antenna is obtained without interference from the RS transmitted from the other antenna (assuming that the channel medium remains practically constant over two successive sub-frame symbols with RS transmission). The CSI transmission from both antennas in the PUCCH is in the same RB throughout the sub-frame.

For high UE velocities, the channel may substantially change between the two consecutive RS symbols in FIG. 12, and then the RS orthogonality from the two UE antennas through OCC is not maintained. An alternative embodiment of the present invention considers the use of different CS for the RS transmission from each UE transmitter antenna in conjunction with the application of STBC. When two UE transmitter antennas are used, two CS are allocated to each UE. In this manner, RS orthogonality is always maintained (as long as the CS is greater than the time dispersion of the channel medium) and the conventional STBC decoding may be used at the Node B receiver. The CSI transmission from each UE antenna may use the same CS as the respective RS transmission or, unlike the RS transmission, the CSI transmission may use both CSs in order to increase the number of transmitted CSI bits and support the transmission of higher CSI payloads or lower code rates.

Figure 13A:
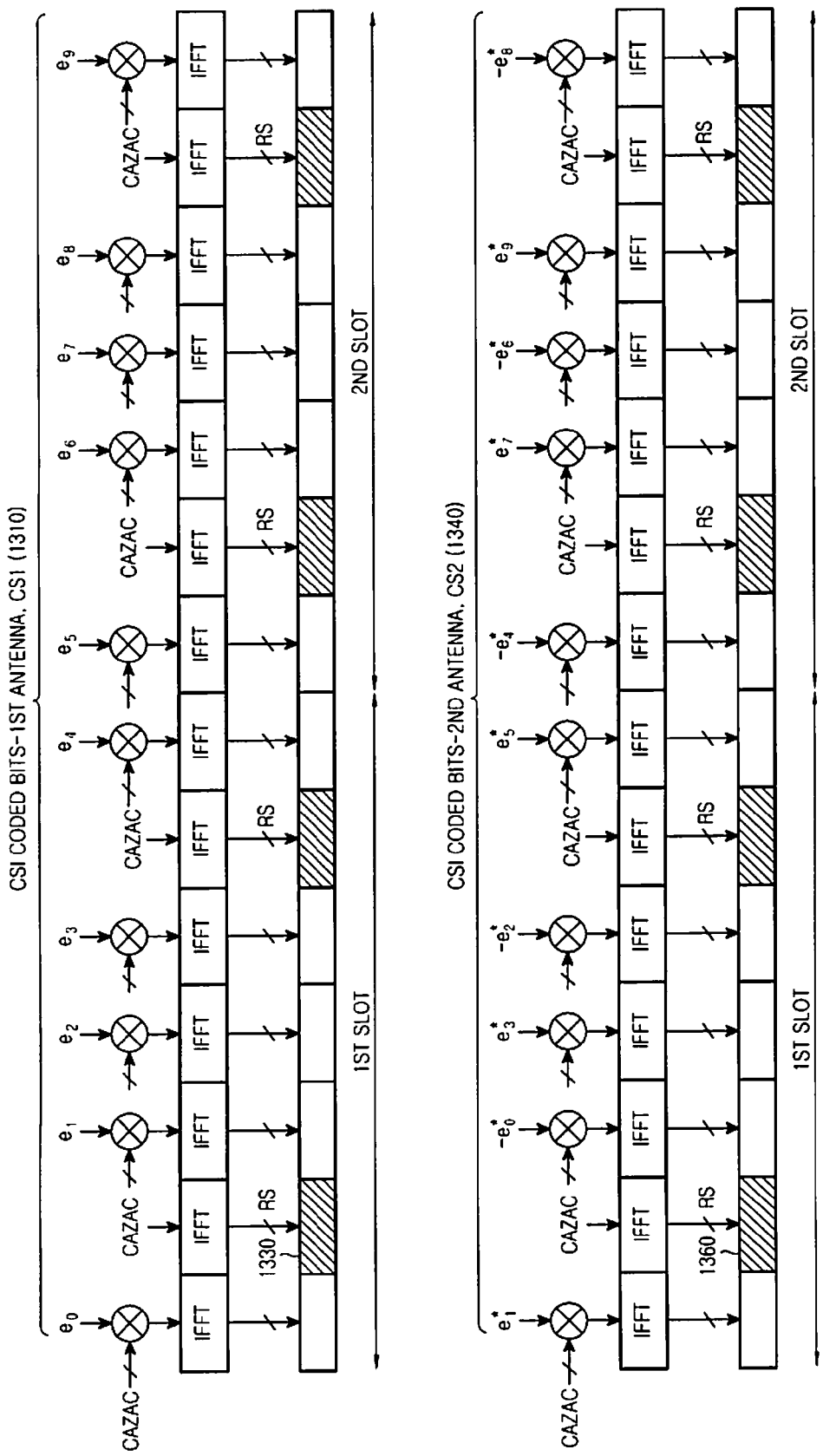
FIG. 13 is a diagram illustrating a PUCCH structure for the CSI transmission using a different cyclic shift per UE antenna for the RS transmission and using both cyclic shifts per UE antenna for the CSI transmission according to an embodiment of the present invention.
Figure 13B:
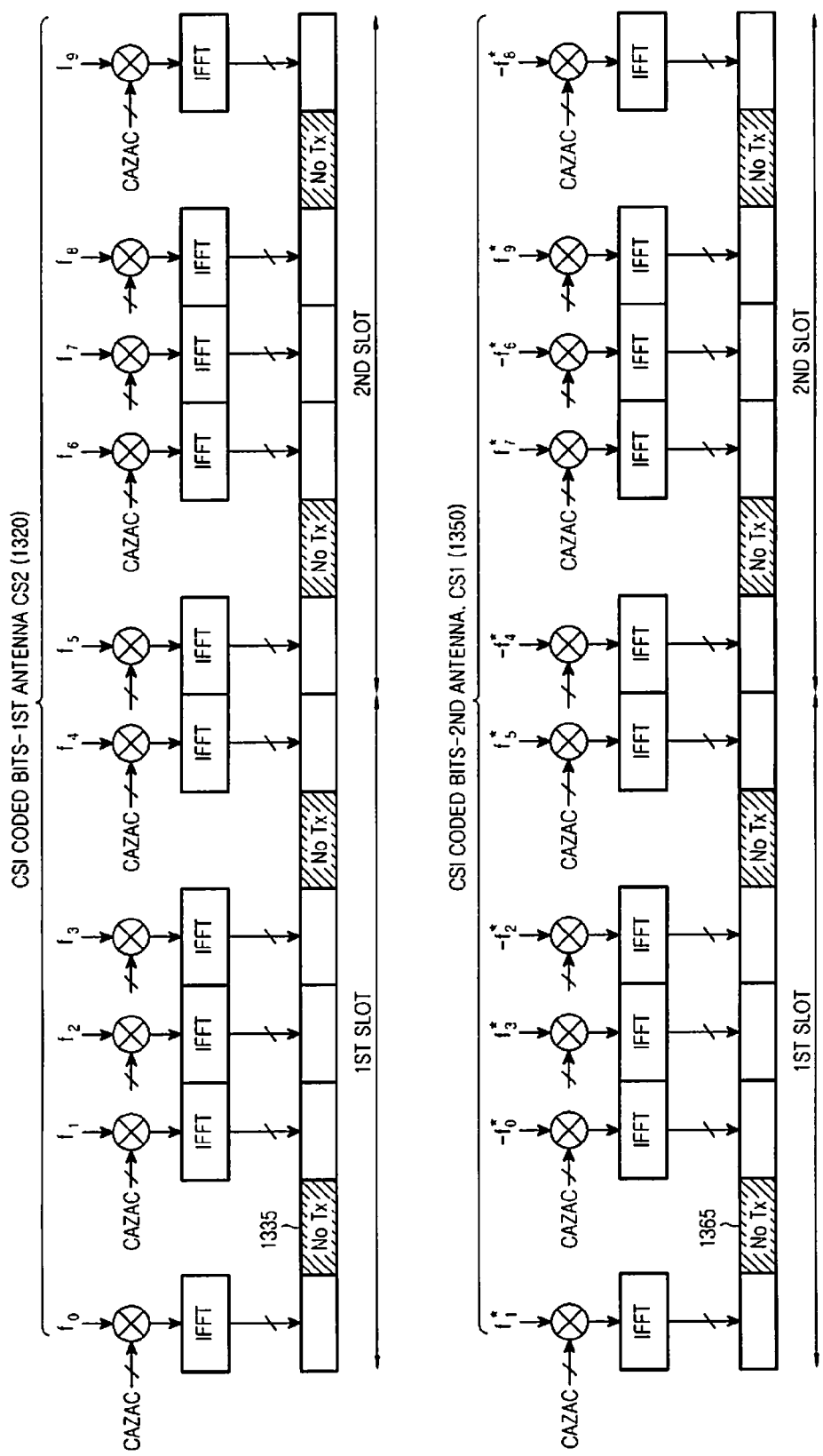

FIG. 13 illustrates a CSI transmission structure in the PUCCH using a different CS per UE antenna for the RS transmission and using both CS per UE antenna for the CSI transmission. Using QPSK modulation, the first UE antenna transmits 10 of the CSI coded symbols 1310, $e_0,e_1,e_2,e_3,e_4,e_5,e_6,e_7,e_8,e_9$ using a CS1 and another 10 CSI coded symbols 1320, $f_0,f_1,f_2,f_3,f_4,f_5,f_6,f_7,f_8,f_9$, using CS2. The RS transmission from the first UE antenna corresponds only to CS1 1330, while there is no RS transmission with CS2 1335. In order to realize STBC using QPSK modulation, the second UE antenna transmits 10 of the CSI coded symbols 1340, $e_1^*,-e_0^*,e_3^*,-e_2^*,e_5^*,-e_4^*,e_7^*,-e_6^*,e_9^*,-e_8^*$, using CS1 and another 10 of the CSI coded symbols 1340, $f_1^*,-f_0^*,f_3^*,-f_2^*,f_5^*,-f_4^*,f_7^*,-f_6^*,f_9^*,-f_8^*$, using CS2. The RS transmission from the second UE antenna corresponds only to CS2 1360, while there is no RS transmission with CS1 1365. The transmission power per antenna may remain constant throughout the PUCCH sub-frame by transmitting the CSI symbols with half the power (in each CS) relative to the RS transmission power.

In an alternative embodiment of the present invention, the Node B may configure a UE to not apply TxD for the CSI transmission in the PUCCH, if the Node B considers the UE as a UE with a high velocity for which the orthogonality of the RS transmission in FIG. 12 cannot be maintained. Although some performance gains from the absence of spatial diversity are not realized without TxD, such gains are partly compensated from time diversity gains due to the high UE velocity causing the channel to vary within each slot. Moreover, use of 2 CSs and the respective overhead increase are avoided. This avoidance can be beneficial for small CSI payloads for which transmission of additional CSI information bits through the second CS per antenna is unnecessary.

As described hereinabove, a communication system may simultaneously support UEs having CSI transmission in a different RB in each PUCCH sub-frame slot (slot-based FH enabled) as well as UEs having CSI transmission in the same RB in both PUCCH sub-frame slots (slot-based FH disabled). A UE may perform HARQ-ACK transmission in the PUCCH with slot-based FH enabled and CSI transmission in the PUCCH with slot-based FH disabled.

Figure 14:
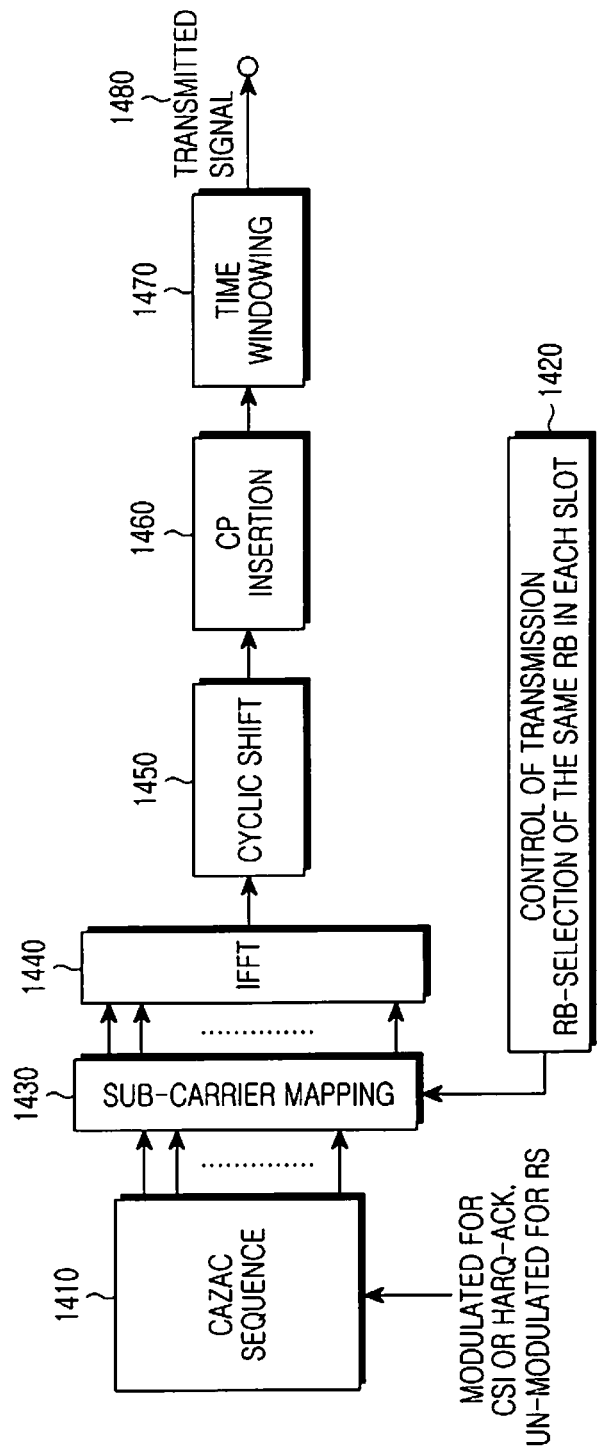
FIG. 14 is a block diagram illustrating the transmitter structure for CSI transmission in the PUCCH without slot-based FH according to an embodiment of the present invention.

FIG. 14 illustrates a transmitter structure for CSI transmission in a PUCCH without slot-based FH. The frequency-domain version of a computer generated CAZAC sequence output from block 1410 is assumed and a single RB is selected at block 1420 for transmission in both sub-frame slots. After sub-carrier mapping is performed at block 1430, an IFFT is performed, at block 1440, and a CS is applied to the output, at 6 block 1450. Finally, a CP is inserted at block 1460, and filtering is applied, at block 1470, to the transmitted signal 1480. In the example according to FIG. 14, a UE applies zero padding in REs used for signal transmission by other UEs and in guard REs (not shown). Moreover, for clarity and conciseness, additional transmitter circuitry such as digital-to-analog converter, analog filters, amplifiers, and transmitter antennas as they are known in the art, are not shown.

Figure 15:
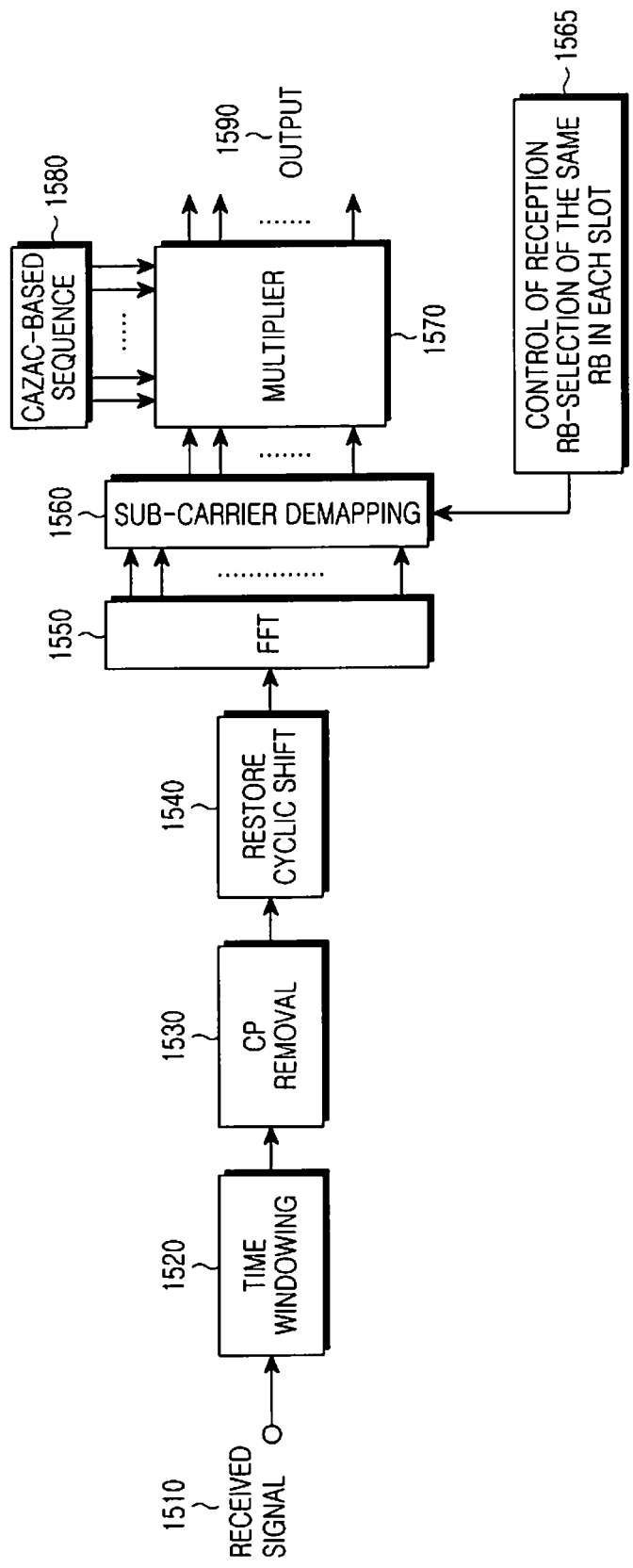
FIG. 15 is a block diagram illustrating the receiver structure for CSI reception in the PUCCH without slot-based FH according to an embodiment of the present invention.

Reverse (complementary) transmitter functions of the functions described with reference to FIG. 14 are performed for CSI reception in the PUCCH without slot-based FH. These reverse functions are conceptually illustrated in FIG. 15. An antenna 1510 receives the RF analog signal and after further processing units (such as filters, amplifiers, frequency down-converters, and analog-to-digital converters) the digital received signal is filtered at block 1520 and the CP is removed at block 1530. Subsequently, the CS is restored at block 1540, a FFT is applied at block 1550, and an RB for the CSI signal transmission in both PUCCH sub-frame slots is selected 1565. After sub-carrier de-mapping is performed at block 1560, the received signal is correlated, at block 1570, with a replica of the CAZAC sequence output at block 1580. Finally, an output is obtained, at block 1590, which can then be passed to a channel estimation unit, such as a time-frequency interpolator, in case of a RS, or to a detector unit in case the CAZAC sequence is modulated by CSI bits or by HARQ-ACK bits. When the UE applies STBC, the first and second UE antennas transmit the coded CSI symbols as illustrated in FIG. 12. The Node B receiver processes the signals from the first and second UE transmitter antennas as previously described in order to obtain a, soft or hard, decision of the transmitted coded CSI symbols.

Figure 16:
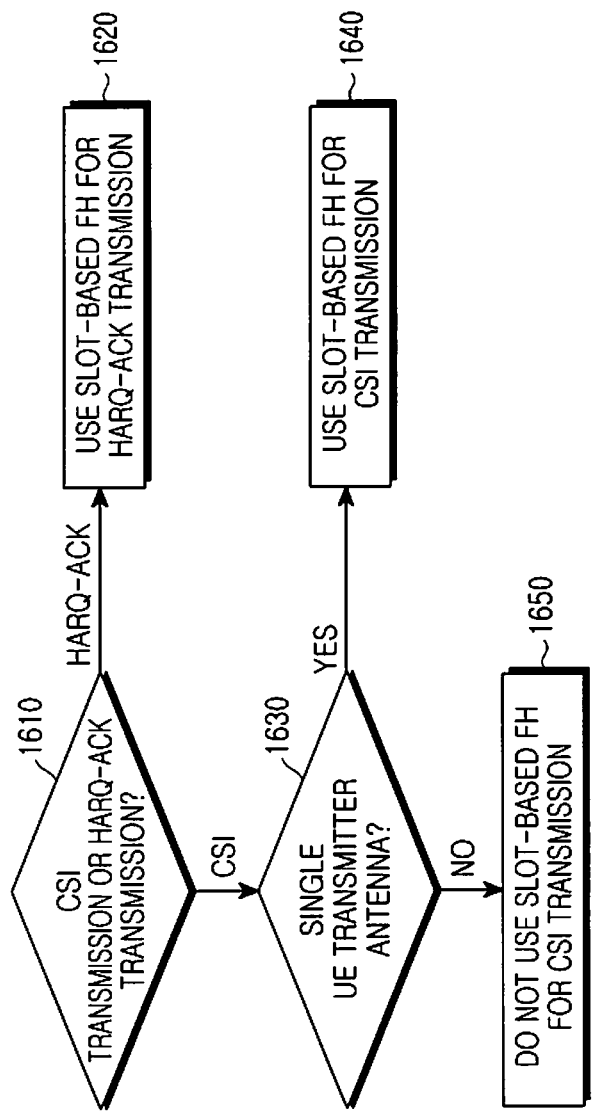
FIG. 16 is a diagram illustrating an exemplary process for a UE to decide the application of slot-based FH for the PUCCH transmission according to an embodiment of the present invention.

FIG. 16 illustrates a flowchart of a decision process at the UE for the application of slot-based FH for the PUCCH transmission in accordance with the embodiments of the present invention. The UCI type for transmission in the PUCCH is first considered step 1610. If HARQ-ACK is transmitted, it is determined that slot-based FH always applies to the PUCCH transmission in step 1620. If CSI is transmitted, then the number of UE transmitter antennas is also considered in step 1630. If there is a single UE transmitter antenna, slot-based FH applies to the PUCCH transmission in step 1640. If there are multiple UE transmitter antennas, it is determined that slot-based FH does not apply to the PUCCH transmission in step 1650. The UE may physically have multiple transmitter antennas, while using only a single transmitter antenna for the PUCCH transmission. For example, if one antenna experiences substantially larger path loss than another antenna (gain imbalance), only the antenna experiencing better propagation characteristics may be used for PUCCH transmission. In another example, the velocity of the UE may be so high that the RS orthogonality illustrated in FIG. 12 is not maintained for the application of STBC in the CSI transmission (the channel medium becomes effectively uncorrelated between two successive RS symbols). Then, STBC may not be used and the CSI transmission may be effectively from a single UE antenna.

While the present invention has been shown and described with reference to certain embodiments thereof, it will be understood by those skilled in the art that various changes in form and details may be made therein without departing from the spirit and scope of the present invention as defined by the appended claims.

What is claimed is:

1. In a communication system, wherein a User Equipment (UE) transmits, to a Node B, one of multiple types of Uplink Control Information (UCI) using a respective Physical Uplink Control CHannel (PUCCH) structure, a method, performed by the UE, for determining an application of Frequency Hopping (FH) for a UCI type transmission, the method comprising the steps of:
    transmitting, when UCI is of a first type, the UCI using FH; and
    transmitting, when UCI is of a second type, the UCI without using FH.

2. The method of claim 1, wherein the first type of UCI includes acknowledgement information associated with a Hybrid Automatic Repeat reQuest (HARQ) process and the second type of UCI includes Channel State Information (CSI).

3. The method of claim 1, further comprising determining whether to apply FH for transmitting the second type of UCI through higher layer signaling by the Node B.

4. In a communication system, wherein a User Equipment (UE) transmits, to a Node B, an Uplink Control Information (UCI) in a Physical Uplink Control CHannel (PUCCH), a method, performed by the UE, for determining an application of Frequency Hopping (FH) for the UCI type transmission, the method comprising the steps of:
    transmitting UCI of a first type using FH when transmission diversity is not applied; and
    transmitting UCI of a second type without using FH when transmission diversity is applied.

5. The method of claim 4, further comprising determining whether to apply FH when transmission diversity is applied through higher layer signaling by the Node B.

6. The method of claim 4, wherein the transmission diversity is applied according to Space Time Block Coding (STBC) or Orthogonal Resource Transmission (ORT).

7. The method of claim 4, wherein the transmitted UCI includes Channel State Information (CSI).

8. In a communication system, wherein User Equipments (UEs) from a first class of UEs and UEs from a second class of UEs transmit to, a Node B, Uplink Control Information (UCI) in a Physical Uplink Control CHannel (PUCCH), a method, performed by a UE, for applying Frequency Hopping (FH) for the UCI type transmission, the method comprising the steps of:
    transmitting UCI of a type using FH if the UE belongs to the first class of UEs; and
    transmitting UCI of a second type without using FH if the UE belongs to the second class of UEs.

9. The method of claim 8, wherein the transmitted UCI includes Channel State Information (CSI).

10. The method of claim 8, wherein the first class of UEs includes legacy UEs and the second class of UEs includes UEs with additional functionalities relative to legacy UEs.

11. A User Equipment (UE) apparatus for transmitting one of multiple types of Uplink Control Information (UCI) using a respective structure in a Physical Uplink Control CHannel (PUCCH), the apparatus comprising:
    a transmitter for, when UCI is of a first type, transmitting the UCI using frequency hopping; and
    a transmitter for, when UCI is of a second type, transmitting the UCI without using frequency hopping.

12. The apparatus of claim 11, wherein the first type of UCI includes acknowledgement information associated with a Hybrid Automatic Repeat reQuest (HARQ) process and the second type of UCI includes Channel State Information (CSI).

13. The apparatus of claim 11, further comprising a controller that determines whether to apply frequency hopping for transmitting the second type of UCI through higher layer signaling by the Node B.

14. A User Equipment (UE) apparatus for transmitting an Uplink Control Information (UCI) in a Physical Uplink Control CHannel (PUCCH), the apparatus comprising:
    a transmitter for transmitting UCI of a first type using frequency hopping when transmission diversity is not applied; and
    a transmitter for transmitting UCI of a second type without frequency hopping when transmission diversity is applied.

15. The apparatus of claim 14, wherein the transmitted UCI includes Channel State Information (CSI).

16. The apparatus of claim 14, wherein the transmission diversity is applied according to Space Time Block Coding (STBC) or Orthogonal Resource Transmission (ORT).

17. The apparatus of claim 14, further comprising a controller that determines whether to apply frequency hopping when transmission diversity is applied through higher layer signaling by the Node B.

* * * * *